United States Patent
Watchi et al.

(10) Patent No.: US 7,329,983 B2
(45) Date of Patent: Feb. 12, 2008

(54) HIGH MECHANICAL AND OPTICAL PERFORMANCE ILLUMINATION SYSTEM

(75) Inventors: Marie-Isabelle Watchi, Paris (FR); Maxime Duran, Paris (FR); Arnaud Huignard, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 33 days.

(21) Appl. No.: 10/561,798

(22) PCT Filed: Jun. 23, 2004

(86) PCT No.: PCT/FR2004/001575
§ 371 (c)(1), (2), (4) Date: Dec. 21, 2005

(87) PCT Pub. No.: WO2005/001872
PCT Pub. Date: Jan. 6, 2005

(65) Prior Publication Data
US 2006/0289832 A1    Dec. 28, 2006

(30) Foreign Application Priority Data
Jun. 23, 2003 (FR) .................... 03 07573
Mar. 22, 2004 (FR) .................... 04 02931

(51) Int. Cl.
*H05B 33/00* (2006.01)
(52) U.S. Cl. ...................................... 313/503
(58) Field of Classification Search ......... 313/503–512
See application file for complete search history.

(56) References Cited

U.S. PATENT DOCUMENTS
3,392,039 A    7/1968    Cuneo, Jr.

FOREIGN PATENT DOCUMENTS
JP    63048723    3/1988
JP    10158644    6/1998
JP    10298546    11/1998

OTHER PUBLICATIONS
Villalobos, Guillermo R. et al, "Protective Silica Coatings on Zinc-Sulfide-Based Phosphor Particles", Journal of the American Ceramic Society, vol. 85, No. 8, pp. 2128-2130, 2002.

*Primary Examiner*—Joseph Williams
(74) *Attorney, Agent, or Firm*—Oblon, Spivak, McClelland, Maier & Neustadt, P.C.

(57) ABSTRACT

The invention relates to an illumination system including phosphore particles dispersed in a solid, durable matrix that can be handled by a user. The illumination system can be a transparent device or a light-scattering device. Further, the illumination system can be applied in monolithic, laminated, single glazing or multiple glazing form.

20 Claims, No Drawings

HIGH MECHANICAL AND OPTICAL PERFORMANCE ILLUMINATION SYSTEM

The present invention relates to the special shaping of phosphore particles known elsewhere, capable of guaranteeing, on the one hand, high mechanical and optical properties, such as mechanical strength under the most exacting handling conditions, strength impact resistance, abrasion resistance, crush and crack resistance and, possibly, delamination in the case of a deposit on a substrate, shear strength, flexural strength, etc. and, on the other hand, transparency, the virtual absence of haze, controlled light transmission between values that can approach 100% and low values in the case of highly scattering materials, optical homogeneity, absence of degradation and yellowing, particularly under the effect of excitation, etc.

The term phosphore particles refers to particles that are able to emit light, particularly in the long wavelength region of the visible spectrum, under the effect of excitation by UV radiation, an electron beam, X-rays, gamma radiation or an electric field, these particles having a size, for example, that lies between a few nanometers and a few microns, and being used particularly in lamps in the form of powdered masses.

In addition, application FR-A1-2 829 481 mentions separately the coating of phosphore particles with a stabilizing sodium silicate film on the one hand and, on the other hand, the deposition of dispersions possibly with other phosphores, in the form of transparent films on a glass substrate. However, the document does not specify how a film, or all the more a transparent film, is to be obtained.

The invention now provides composites of phosphore particles capable of preserving integrity of state and shape over long periods, under normal conditions of use (assembly, installation, cleaning, etc.).

This objective is achieved by the invention, the subject of which is an illumination system consisting of phosphore particles dispersed in a solid, durable matrix, while enabling it to be handled by a user.

Phosphore particles falling within the scope of the invention are, for example:

$Ca_{10}(PO_4)_6FCl:Sb,Mn$
$(Sr,Mg)_2P_2O_7:Eu$
$Sr_2P_2O_7:Eu$
$Sr_5(PO_4)_3Cl:Eu$
$(Sr,Ca,Ba)_5(PO_4)_3Cl:Eu$
$BaMg_2Al_{16}O_{27}:Eu$
$BaMg_2Al_{16}O_{27}:Eu, Mn$
$CaWO_4$
$CaWO_4:Pb$
$Ba_2P_2O_7:Ti$
$(Ba,Ca)_5(PO_4)_3Cl:Eu$
$Zn_2SiO_4:Mn$
$Y_3Al_5O_{12}:Ce$
$MgAl_{11}O_{19}:Ce,Tb,Mn$
$LaPO_4:Ce,Tb$
$Y(P,V)O_4:Eu$
$3.5\ MgO.0.5\ MgF_2.GeO_2:Mn$
$(Sr,Mg)_3(PO_4)_2:Sn$
$Y_2O_3:Eu$
$CaSiO_3:Pb,Mn$
$BaSi_2O_5:Pb$
$(Ba,Sr,Mg)_3Si_2O_7:Pb$
$SrB_4O_7:Eu$
$YPO_4:Ce$
$LaPO_4:Ce$
$(Mg,Ba)\ Al_{11}O_{19}:Ce$
$LiAlO_2:Fe$
$ZnS:Ag,Cl$
$ZnS:Mn$
$ZnS:Ag,Al$
$ZnS:Cu,Al$
$ZnS:Cu,Au,Al$
$Y_2O_2S:Eu$
$ZnS:Ag+(Zn,Cd)S:Cu$
$ZnS:(Zn)$
$(KF,MgF_2):Mn$
$(Zn,Cd)S:Ag$
$(Zn,Cd)S:Cu$
$ZnO:Zn$
$(Zn,Cd)\ S:Cu,Cl$
$ZnS:Cu$
$ZnS:Cu,Ag$
$MgF_2:Mn$
$(Zn,Mg)F_2:Mn$
$Zn_2SiO_4:Mn,As$
$Gd_2O_2S:Tb$
$Y_2O_2S:Tb$
$Y_3\ (Al,Ga)_5O_{12}:Ce$
$Y_2SiO_5:Ce$
$Y_3Al_5O_{12}:Tb$
$Y_3\ (Al,Ga)_5O_{12}:Tb$
$InBO_3:Tb$
$InBO_3:Eu$
$ZnS:Ag$
$Y_2SiO_5:Tb$
$(Zn,Cd)S:Cu,Cl+(Zn,Cd)S:Ag,Cl$
$InBO_3:Tb+InBO_3:Eu$
$ZnS:Ag+ZnS:Cu(or\ ZnS:Cu,Au)+Y_2O_2S:Eu$
$InBO_3:Tb+InBO_3:Eu+ZnS:Ag$
$Gd_2O_2S:\ Eu$
$(Y,Sr)TaO_4$
$(Y,Sr)TaO_4:Gd$
$(Y,Sr)TaO_4:Nb$
$BaFCl:Eu$
$BaFBr:Eu$
$BaMgAl_{10}O_{17}:Eu$
$YBO_3:Tb$
$BaAl_{12}O_{19}:Mn$
$(Y,Gd)BO_3:Eu$
$YBO_3:Eu$
$Sr_4Al_{14}O_{25}:Eu,Dy$
$SrAl_2O_4:Eu,Dy$
$CaAl_2O_4:EU,Nd$
$Y_2O_2S:Eu,Mg,Ti$

These phosphore particles or these mixtures of phosphore particles are characterized by the emission of long wavelength radiation in the visible region, corresponding to different colors, white light, or in the IR or UV. The last three mentioned in the above list are notable for the intensity, persistence and duration of their activity, after any excitation source has been removed, in particular at night.

The invention therefore makes it possible to provide handlable, reliable, strong solid illuminating objects that can coat a multitude of forms, such as a coating on a substrate, capable of illuminating in various colors, opening the way to the most novel and varied esthetic or artistic creations.

Preferably, the particles are phosphores within the visible region, in which most of the applications envisaged below present the greatest interest. The particles can be excited by electromagnetic radiation in the UV, visible, IR region or by X-rays or by gamma rays, or by a beam of particles (electrons, ions) or by an electric field. Excitation by UV may be derived from the deexcitation of a plasma or of an ionized gas.

According to a preferred embodiment, the matrix is inorganic and comprises, in a particularly preferred manner, lithium silicate. It should be stated that sodium silicates, and to a lesser extent potassium silicates, are suitable if need be for an opaque illumination system, lithium silicate being particularly recommended for a transparent illumination system. Accordingly, it has been observed with sodium silicate that there is a migration to the surface of a very hygroscopic and scattering crust based on sodium hydroxide that is continually regenerated. Lithium silicate proves to be notable for the possibility of distributing therein, in a uniform manner, high concentrations of phosphore particles in the most separated state possible, as well as for its compatibility with many substrates, including glass. On account of the fact that the matrix comprises lithium silicate, it will be understood that, in reality, the matrix is a product of the partial or total conversion of lithium silicate, in particular into silica, in which lithium silicate and/or lithium remain entirely detectable.

According to another embodiment, the matrix comprises a product of the polymerization/polycondensation of a silicon alkoxide such as tetraethoxysilane (TEOS), tetramethoxysilane (TMOS), methyltriethoxysilane (MTEOS) and the like. These precursors of the matrix provide excellent conditions for compatibility with many phosphore particles, among those previously mentioned.

In a practical and effective embodiment of the invention, the matrix is in the form of a thin layer adhering to a substrate consisting in particular of glass, for example in the form of a sheet, but also of a slab intended to constitute an electronic display screen, a tube, in particular for lighting, fiber or fabric or plastic. For the latter, reference may be made to any generally transparent plastic such as polycarbonate, polyvinyl butyral, a polyolefin such as polyethylene or polypropylene, poly(ethylene terephthalate), polyurethane, acrylic polymer such as poly(methyl methacrylate), an ionomer resin, various copolymers, etc., the use of which is of course limited by possible formation of a thin layer at a temperature capable of affecting or degrading the plastic.

The invention comprises two main variants.

According to the first variant, the phosphore particles are in aqueous suspension and their size is at most equal to 100 nm, preferably 30 nm, preferably 10 nm, and the assembly that they form with the matrix is transparent.

According to the second variant, the size of the phosphore particles lies between 0.5 and 10 µm, it being possible for particles scattering visible light to be then advantageously incorporated in the matrix (particles may be involved other than phosphore particles having a size of, in particular, between 100 nm and 1 µm, in particular between 300 and 700 nm, such as alumina, or phosphore particles themselves; these light-scattering particles are dielectric, semiconduction or conducting particles).

Thus, phosphore particles with a size between 30 and 500 nm are not excluded from the invention, those having in particular a size at least equal to 400 nm that are capable of scattering visible light making it unnecessary to add other scattering particles.

In a particularly advantageous embodiment of the illumination system of the invention, in the case where the matrix is in the form of a thin layer adhering to a substrate, the latter is capable of exciting phosphore particles, and is in particular an electroconductor, in particular of the UV electroluminescent type.

In an equally advantageous embodiment, the substrate is capable of emitting radiation with a wavelength in the visible region under suitable excitation. It is then, for example, made of glass with a cerium content, capable of emitting blue light under ultraviolet radiation.

According to another alternative of the design of the illumination system, two cases may be distinguished in which:

the phosphore particles emitting different wavelengths are associated, separated from each other and homogenized, so as to produce white light, yellow light, etc., on the one hand; and the phosphore particles that are identical or emit different wavelengths are combined in variable compositions and/or concentrations, so as to form signs such as written or similar signs, or for any other, especially decorative, purpose.

The main processes for preparing the illumination system of the invention consist of:

cold deposition processes by means of a liquid, such as spray coating, flow coating, dip coating, spin coating, screen printing, followed by a heat treatment at 100-650° C., for example (annealing, tempering, etc.) according to the nature of the matrix; or a vacuum deposition process.

In addition, other subjects of the invention are:

the application of an illumination system as described above to a transparent device;

the application of the illumination system to a light-scattering device;

the application of the illumination system to a lamp, in particular a thin one, or to a device illuminating at night, in particular for signs, or for decorative purposes or to a flat lamp as described in the application WO 04/15739;

the application of the illumination system to monolithic, laminated, single glazing or multiple glazing designed for buildings, to a transport vehicle, such as an automobile rear window, side window or roof, to any other terrestrial or aquatic vehicle or aircraft, to street furniture, such as a bus shelter, to a road sign or to an advertisement panel, to an aquarium, to a store window, to a glasshouse, to interior furniture, to a mirror, to a screen for a display system of the computer type, to a television, to a telephone, to electrically controllable glazing such as electrochromic glass, to liquid crystals, to electroluminescent material or to photovoltaic glass.

It is stated that in this last application, the association of the illumination system with glazing is compatible with all known practical applications thereof, either on the same face as that supporting the illumination system, above or below, or on other faces of the glazing, namely a hydrophobic/oleophobic, hydrophilic/oleophilic, anti-soiling photocatalytic layer, a multilayer reflecting thermal radiation (solar protection layer) or IR (low-e layer), antireflection layer, etc.

As a valuable example, mention may be made of glazing that separating, for example, an enclosure in a building from the outside atmosphere, the inner face of which is illuminating according to the invention, and the outer face of which is electrochromic, that is to say capable of being darkened by applying a voltage to the layer. In this way, the functionality obtained is that of illuminating the interior while blocking off external light.

In the illuminating glazing application according to the invention, the glazing guarantees maximum transparency and maximum optical quality in the absence of excitation, and constitutes an illuminating surface in the presence of excitation.

The screen application for a display system can be generalized to any application requiring a light source and means of treatment thereof, in the form of a light box.

It consists in particular of backlight.

The invention is illustrated by the following examples of embodiments.

EXAMPLE 1

YVO$_4$:Eu nanoparticles were first of all synthesized by a colloidal method.

The entire synthesis of colloidal solutions was carried out in water at a temperature of 60° C. The insoluble citrate complex was formed by mixing 0.75 equivalents of sodium citrate (0.1 mol/l, 15 ml) with 1 equivalent of (Y,Eu) (NO$_3$)$_3$ (0.1 mol/l, 20 ml). Addition of 0.75 equivalents of an Na$_3$VO$_4$ solution with a pH of 12.5 (0.1 mol/l, 15 ml) caused the precipitate to dissolve and the reaction to start. The pH of the clear solution obtained was 7.6. At the end of 30 minutes of reaction, heating was stopped. The colloidal solution obtained was then dialyzed in water at neutral pH so as to eliminate various counterions (Na$^+$, NO$_3^-$) or any unreacted species. Following the dialysis step, the concentration of the colloidal solution was of the order 10$^{-2}$ mol/l.

The colloidal solutions were then concentrated by evaporation to dryness under mild conditions (40° C. under vacuum). The powder obtained was easily redispersed in a very small quantity of water which enabled very concentrated colloidal solutions to be obtained (up to 2 mol/l, that is 400 g/l) Moreover, the size measured by light scattering after redispersion (10±3 nm) was identical to that of the colloid obtained after dialysis: the colloids underwent no aggregation during the concentration step. As a consequence, the concentrated colloidal solutions were optically transparent.

Transparent luminescent films were prepared in the following way: 0.2 to 1 ml of lithium silicate (30% by mass in water, pH 12) was added to 4 ml of the concentrated colloidal solution of YVO$_4$:Eu nanoparticles. The sol obtained was filtered (glass fiber prefilter and 0.45 µm filter) and then deposited by centrifuging (speed of rotation 1000 rpm for 60 seconds) onto a float glass substrate (5×5 cm$^2$). The thin films obtained were finally annealed at 450° C. for 12 hours. The purpose of this heat treatment was to consolidate the film mechanically and to increase the luminescence (elimination of hydroxyl groups that inhibit the luminescence of europium ions). After annealing, the thin films were perfectly transparent and had a thickness of between 0.2 and 0.7 µm.

The thin films were placed under a UV lamp emitting at 254 nm. Red luminescence, characteristic of europium ions, was observed within the YVO$_4$ matrix. Luminance measurements were carried out and confirmed what was visually observed: light emission was more intense on the cut edge of the film than in the center. Indeed, the luminance was 5 Cd/m$^2$ at the center whereas it was 20 Cd/m$^2$ at the cut edge.

EXAMPLE 2

This example describes the preparation of scattering luminescent layers.

12.8 g of alumina particles with a mean diameter of 500 nm were added to 176 g of deionized water together with 0.24 g of polyacrylic acid (50% by weight solution in water). Sodium hydroxide was then added until a pH of 10 was reached. 5 g of LaPO$_4$:Ce,Tb particles with a mean diameter of 2 µm, sold by Nichia, were then added. The mixture was then homogenized in a turbine for 5 minutes. 11 g of lithium silicate (30% by weight solution in water) were then added. After 5 minutes of homogenization in a turbine, the mixture was deposited on a 10×10 cm$^2$ glass substrate by flow coating.

Drying was carried out under an IR lamp (temperature of the coating approximately 80° C.). The coating obtained had a T$_L$ of 60% and haze close to 100%.

Green luminescence produced in the coating was observed under photoexcitation at 257 nm.

The invention claimed is:

1. An illumination system, comprising:
   phosphore particles dispersed in a solid, durable matrix; and
   a substrate;
   wherein;
   the matrix is in the form of a thin layer adhered to the substrate; and
   the illumination system can be handled by a user.

2. The illumination system as claimed in claim 1, wherein the phosphore particles are phosphores within the visible region.

3. The illumination system as claimed in claim 1, wherein the phosphore particles can be excited by electromagnetic radiation in the UV, visible, IR region or by X-rays or by gamma rays, or by a beam of particles (electrons, ions) or by an electric field.

4. The illumination system as claimed in claim 1, wherein the matrix is inorganic.

5. The illumination system as claimed in claim 4, wherein the matrix comprises lithium silicate.

6. The illumination system as claimed in claim 4, wherein the matrix comprises a product of the polymerization/polycondensation of a silicon alkoxide.

7. The illumination system as claimed in claim 1, wherein the phosphore particles are in aqueous suspensions and wherein the phosphore particle size is at most equal to 100 nm and in that the assembly that the phosphore particles form with the matrix is transparent.

8. The illumination system as claimed in claim 1, wherein the size of the phosphore particles is between 0.5 and 10 µm.

9. The illumination system as claimed in claim 8, wherein the matrix comprises particles that scatter visible light.

10. The illumination system as claimed in claim 1, wherein the substrate is capable of exciting phosphore particles, in particular an electroconductor, in particular of the UV electroluminescent type.

11. The illumination system as claimed in claim 1, wherein the substrate is capable of emitting radiation with a wavelength in the visible region under suitable excitation.

12. The illumination system as claimed in claim 11, wherein the substrate comprises glass with a cerium content capable of emitting blue light under ultraviolet radiation.

13. The illumination system as claimed in claim 1, wherein the substrate comprises glass in the form of a sheet, slab, tube, fiber or fabric.

14. The illumination system as claimed in claim 1, wherein the substrate comprises plastic.

15. The illumination system as claimed in claim 1, wherein the phosphore particles emit different wavelengths of radiation and are associated there with, separated from each other and homogenized, so as to produce light.

16. The illumination system as claimed in claim 1, wherein the phosphore particles that are identical or emit different wavelengths are associated therewith in variable compositions and/or concentrations, so as to form signs such as written or similar signs, or for a decorative purpose, or any other purpose.

17. A method of applying an illumination system, comprising applying the illumination system as claimed in claim 1 to a transparent device.

18. A method of applying an illumination system, comprising applying the illumination system as claimed in claim 1 to a light-scattering device.

19. A method of applying an illumination system, comprising applying the illumination system as claimed in claim 1 to a lamp.

20. A method of applying an illumination system, comprising applying the illumination system as claimed in claim 1 to at least one member selected from the group consisting of monolithic, laminated, single glazing or multiple glazing designed for buildings, vehicles, street furniture, road signs, advertisement panels, aquariums, interior furniture, mirrors, screens for display systems, telephones, electrically controllable glazing, liquid crystals, electroluminescent materials and photovoltaic glasses.

* * * * *